Jan. 25, 1966  J. HERMES  3,230,991

FOOD-COMMINUTING MACHINE

Filed Nov. 27, 1962  5 Sheets-Sheet 1

*Inventor:*
Josef Hermes
By
Karl F. R...
AGENT

Jan. 25, 1966 J. HERMES 3,230,991
FOOD-COMMINUTING MACHINE
Filed Nov. 27, 1962 5 Sheets-Sheet 2

Inventor:
Josef Hermes
BY
AGENT

Jan. 25, 1966   J. HERMES   3,230,991
FOOD-COMMINUTING MACHINE
Filed Nov. 27, 1962   5 Sheets-Sheet 3

*Inventor:*
Josef Hermes
BY  *Karl G. Ross*
AGENT

Jan. 25, 1966 J. HERMES 3,230,991
FOOD-COMMINUTING MACHINE
Filed Nov. 27, 1962 5 Sheets-Sheet 4
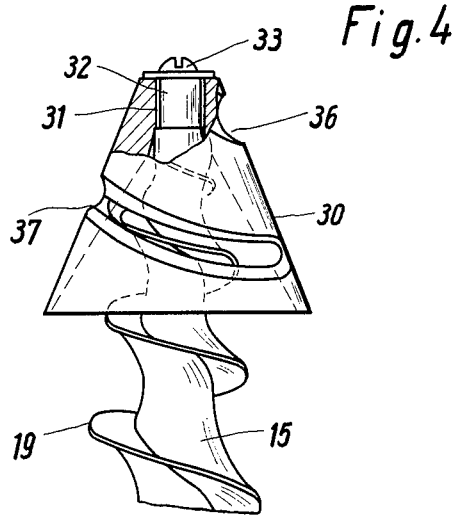
Fig. 4
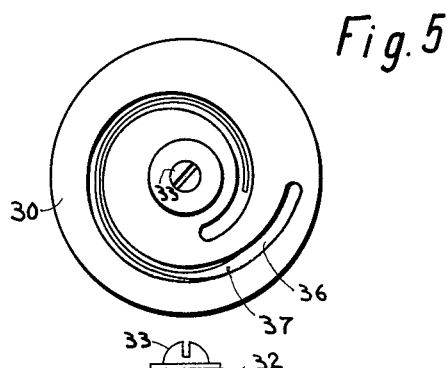
Fig. 5
Fig. 4A
Inventor:
Josef Hermes
BY 
AGENT

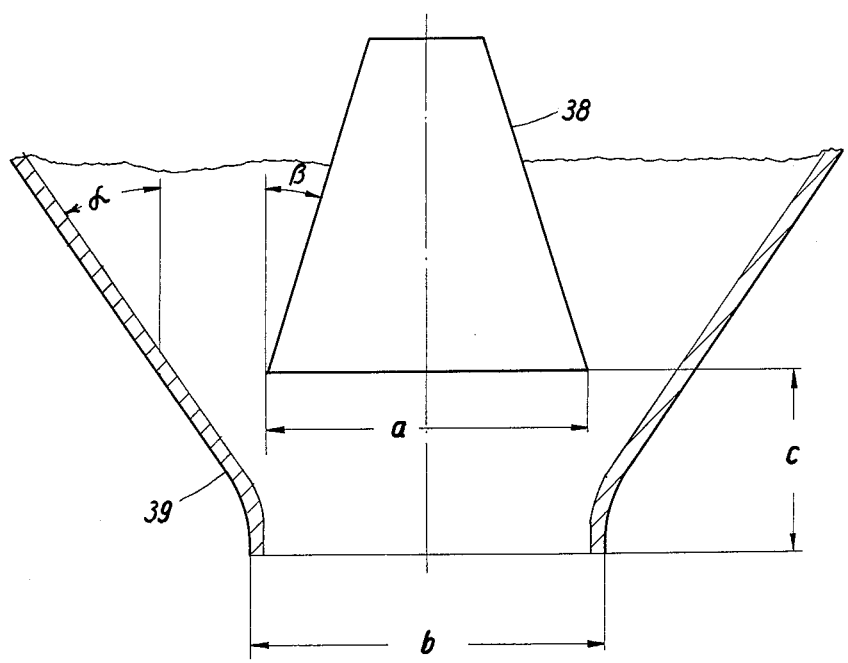

United States Patent Office 3,230,991
Patented Jan. 25, 1966

3,230,991
FOOD-COMMINUTING MACHINE
Josef Hermes, Darmstadt, Germany, assignor, by mesne assignments, to Belder Trust reg., Vaduz, Liechtenstein
Filed Nov. 27, 1962, Ser. No. 240,347
Claims priority, application Germany, Nov. 27, 1961, W 31,136; Sept. 15, 1962, W 32,964
7 Claims. (Cl. 146—192)

The present invention relates to food-comminuting machines and, more particularly, to meat choppers or grinders having a funnel-shaped inlet.

Food-comminuting machines of the aforementioned type generally comprise a housing, which forms a cutting chamber, and rotary cutting means therein for rapidly reducing the size of pieces of food material. Such apparatus has become widely used for meat-chopping purposes and is provided with an inlet funnel from which precomminuted food material is fed to the cutting chamber. Since this material often forms "bridges" within the funnel, a continuous feed was not to be expected in the absence of an attendant. The latter was repeatedly forced to push the material within the funnel further into the interior of the machine to prevent discontinuous operation. Functioning of this type has a special disadvantage in that air is frequently aspirated into the cutting chamber upon cessation of the material feed so that the comminuted particles are whipped into a foamy product. This product has an unpleasing appearance and may be rejected by the consumer. To avoid this result, an attendant is generally stationed permanently at the machine with an accompanying increase in the operating cost.

It is an object of the present invention to provide, in the machine of the aforedescribed type, means for eliminating discontinuous operation thereby effecting a substantial saving of cost and resulting in an improved product.

This object is attained in accordance with the invention by providing a food-comminuting machine having an upright funnel with a body essentially disposed in the funnel and defining therewith a limited annular clearance for the passage of material to be comminuted and rotatable feed means disposed below the body for substantially continuously drawing material through the clearance into the cutting chamber. Advantageously this feed means includes a member rotating at extremely high speed and capable of reducing the pressure below the body so that the food material is forced into the chamber by the relatively elevated ambient atmospheric pressure.

It has been found that best results are obtained when the central body is generally of conical configuration and conforms to a frustum with its largest diameter juxtaposed with the discharge opening of the funnel. Thus this body may be constituted in the form of a hollow or downwardly concave hood generally of mushroom shape. The rotary feed member is preferably of conical configuration and is provided with surface formations adapted to generate a suction below the body upon rotation. These formations may include a plurality of angularly spaced radial ribs which extend along respective generatrices of the conical body and/or a helicoidal rib which like the axially extending ribs run from the lower edge of the frustoconical body through the discharge opening of the funnel into the region of the cutting means. The surface formation may, however, also include grooves axially or helicoidally formed in the rotating member. It is important to note that the latter should have a discontinuous or irregular surface so as to be capable of displacing air within the cutting chamber, thereby producing the suction.

According to a more particular feature of the invention, the frustoconical body or hood is also provided with advancing means for engagement with the food material and conducting it into the region of the rotating member. To this end the hood can be provided with a spirally extending groove and/or slot which draws the material downwardly. The slot may communicate with the interior of the concave hood while the rotary member extends into the latter so that material forced into the interior by the screw action of the rotating body may then be conveyed by the rotating member into the region of the cutting means. To facilitate manufacture of the hood the interior thereof is also formed of frustoconical configuration with, however, an apex angle which exceeds that of the external surface of this body.

It has also been found that excellent results can be obtained when a plurality of feeding means, each including a frustoconical body and an associated rotating member are axially aligned within the funnel. Each of these elements can thus be removably mounted upon a common drive shaft for concurrent rotation. It may be desirable, in most cases, to make the central bodies of such an array of progressively decreasing diameter in downward direction so that an effective annular clearance is provided between each of the bodies and the adjacent funnel wall in order to obtain maximum efficiency from the suction forces created by the respective rotating members.

At the base of the rotating member, I prefer to provide a centrifugal plate which extends transversely to the axis of rotation thereof and thus to the funnel axis. This plate rotates jointly with the member and is provided, on its upper face, with irregularities or formations capable of casting the comminuted material outwardly. The centrifugal plate may also be formed with a recess designed to receive the blade-support member of the cutting means and/or the drive shaft of a highspeed motor. There has been found to be a certain optimum dimensioning of the funnel and central body for use with food materials such as comminuted meat. It has been observed, in this connection, that best results are obtained when the funnel has an apical half-angle of about 35° when the angle between the outer hood or body surface and a line parallel to the axis is approximately 17° or about half the apical half-angle of the funnel. Moreover, the diameter of the lower edge of the frustoconical body, the diameter of the funnel outlet and the distance above the latter at which the body is located should be in the ratio 9:10:5.

The above and other objects, features and advantages of the present invention will become more readily apparent from the following description, reference being made to the appended drawing in which:

FIG. 4 is an elevational view of a modified central body;

FIG. 4A is a cross-sectional view taken along the line IVA—IVA of FIG. 4;

FIG. 5 is a plan view of this body; and

FIG. 6 is an axial cross-sectional view diagrammatically illustrating critical dimensioning of the present improvement.

Figure 1:
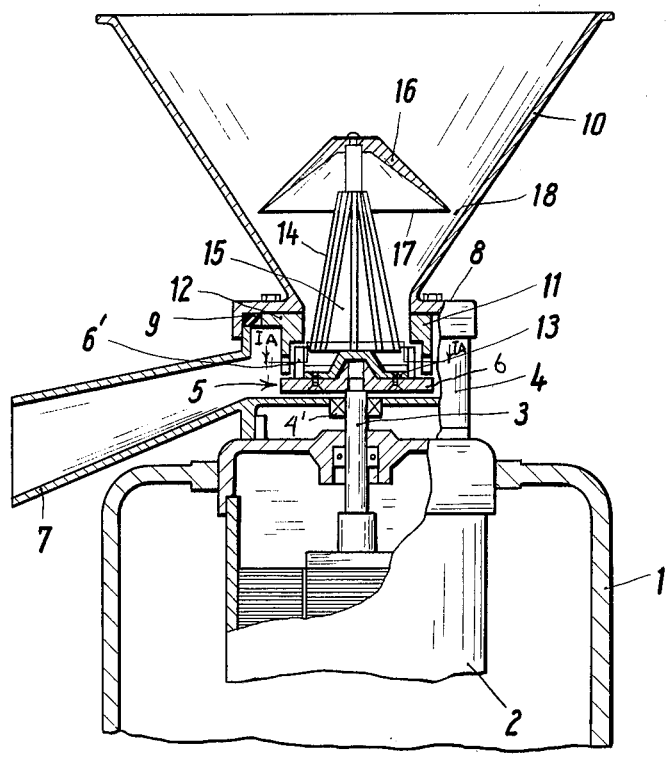
FIG. 1 is an axial cross-sectional view through a meat-comminuting machine according to the invention.
Figure 1A:
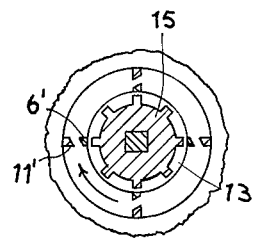
FIG. 1A is a cross-sectional view taken along the line IA—IA of FIG. 1.

In FIG. 1 I show a comminuting machine in which a stand or base 1 carries a drive motor 2 whose shaft 3 projects through a seal 4' in the floor of a housing 4 which encloses a comminuting chamber 4''. Seal 4' prevents any liquid within this chamber from reaching the motor 2. The shaft 3 carries a work element 5 constituted by a cutting means and feeding means in accordance with the present invention. This element 5 is axially removable from the shaft but rotatably entrained therewith via a key 3'. Housing 4 is formed with an outlet chute 7 and a cover 8 which is bolted to the lower portion of the housing at 8'' with interposition of a rubber sealing and shock-absorbing ring 9. A flange 12 of cover 8 carries a removable cutting ring 11 whose blades 11' are affixed thereto.

A centrifuge plate 13 has detachably secured thereto a cutting crown 6 whose blades 6' extend into the cutting chamber 4'' and are inclined with respect to the blades 11'. Plate 13 lies generally transverse to the axis of rotation of the shaft and carries a rotating conical member 15 whose surface formations 14 are irregularities capable of producing a suction below the lower edge 17 of a frustoconical body 16. The latter is formed with a shoulder resting upon the mandrel or stud 15' so that it is centered thereby and detachably affixed thereto by a screw 15''. The lower edge 17 of body 16 forms with the inner surface 10' of the funnel 10, which is secured to cover 8, an annular inlet clearance 18 of limited width. Centrifuge plate 13 also carries a plurality of angularly spaced generally radial vanes 40 along its upper surface to facilitate the centrifugal displacement of comminuted material.

In operation, previously comminuted food material is placed into the hopper formed by the funnel 10 and the machine is set in motion. By virtue of the fact that a suction is developed at the lower edge 17 of central body 16, as a consequence of the rapid rotation of conical member 17 with its angularly spaced ribs 14 extending along generatrices thereof, the material is drawn through the gap 18 in a continuous manner. It is also displaced by rotating member 15 whereby it is centrifugally cast into the path of the rapidly rotating blades 6' for further particulation. Any material falling onto plate 13 is likewise thrown outwardly into the path of the blades. The comminuted material thus passes out of the cutting chamber 4'' via the chute 7 without foaming. The ready disassembly of the unit can be effected by removal of screws 15'' and bolts 8'' to facilitate cleaning.

Figure 1B:
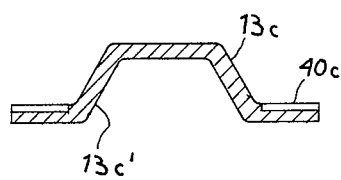
FIG. 1B is an axial cross-sectional view through a modified centrifugal plate.
Figure 1C:
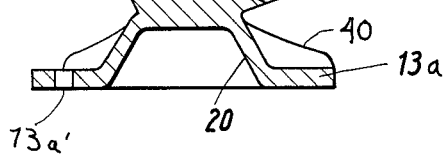
FIG. 1C is a plan view of this plate.
Figure 1C:
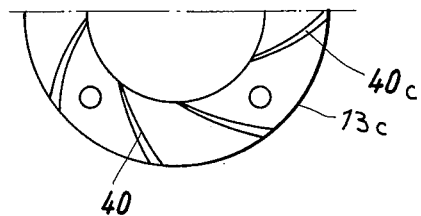

In FIGS. 1B, 1C there is seen a plate 13c, generally similar to plate 13 but provided with spiral grooves 40c for centrifugally displacing the particles. As is the case with the recess 20 of plate 13, plate 13c has a conical recess 20' adapted to receive the cutting crown 6 and the end of shaft 3.

Figure 2:
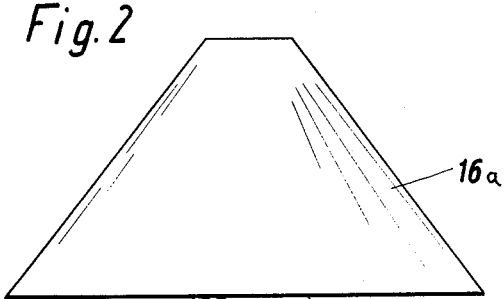
FIG. 2 is an elevational view, partly in section, of a modified feed means and associated central body.
Figure 3:
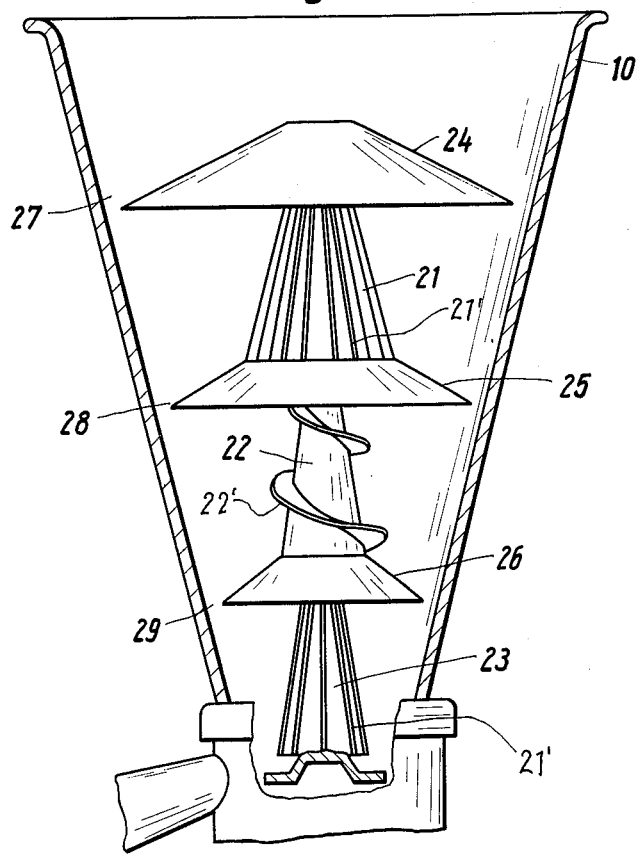
FIG. 3 is a view similar to FIG. 1 of a portion of a machine according to another embodiment of the invention.

The rotary conical member 15a of FIG. 2 is seen to have a spiral or helicoidal rib 19a which extends from the lower edge of frustoconical body 16a to its centrifuge plate 13a. The operation of this arrangement is, of course, similar to that previously described. FIG. 3, however, shows a modification wherein a plurality of frustoconical bodies 24, 25, 26 are axially spaced along a common drive shaft and removably secured thereto, while associated rotating members 21, 22 and 23 of conical configuration are also provided. Each of the central bodies 24, 25, 26 forms with an adjacent portion of the wall of funnel 10 an annular clearance 27, 28, 29 through which the food material is aspirated as a consequence of the suction developed by the corresponding rotating member. At least one of the central bodies 26 has the aforementioned critical dimensioning with respect to the outlet of the funnel. It may be desirable to design the unit so that the bodies 24, 25 and 26 are of progressively decreasing diameter to obtain maximum effect from the rapid rotation of the respective members. The uppermost member may, as indicated, be provided with angularly spaced ribs 21' lying along generatrices of the member while a similar configuration may be employed in connection with the lowermost member 23. The intermediate member 22 should, however, have a helicoidal rib 22' for best results.

In FIGS. 4 and 5 I show an arrangement wherein the rotating body or hood 30 is provided with advancing means for aiding in bringing the material into the region of the cutter. The body 30 is provided with a central bore 31 which is mounted upon the stud 32 of a rotating member 15b by a screw 33 and is provided with a spiral groove 36 for conducting the material in downward direction upon rotation of the body along with the member 15b in a clockwise sense (FIG. 5). At least over a major part of this groove I provide a throughgoing slot 37 communicating with the interior of the concave body and having a width $d$ of progressively increasing size from the upper to the lower end of the slot. Advantageously, this width increases by at least one half (e.g. from 6 to 9 mm.) over the length of the slot. The latter brings the prechopped material into the region of the spiral rib of member 15b which carries it down toward its centrifuge plate and conveying it into the region of the blades. Thus the ribbed portion of this member 15b extends in the hood 30. To facilitate manufacture of the latter the inner conical surface of the body has a larger apical angle than the outer surface. In FIG. 6 I show the dimensioning characterizing the embodiments of FIGS. 1, 2, 3 and 4. It may be seen, in this connection, that the diameter $a$ of the centrally located frustoconical body, the diameter $b$ of the outlet of the funnel and the distance $c$ above this outlet at which the lower edge of the body is disposed are in the ratio of substantially 9:10:5 while the half-angle $\alpha$ of the funnel is about 35°. The external angle $\beta$ included between the outer surface of the body and a line parallel to the axis is about half $\alpha$ or approximately 17°.

The invention as described and illustrated is believed to admit of many modifications and variations within the ability of persons skilled in the art, all such modifications and variations being deemed to be included within the spirit and scope of the appended claims.

I claim:

1. In a food comminuting machine, in combination, a housing forming a cutting chamber; cutting means within said chamber and including a disc provided substantially along its peripheral edge with an annularly arranged row of cutting teeth; a feed funnel having an upright axis mounted on said housing and communicating with said chamber; a substantially frustoconical downwardly diverging body coaxially arranged in said funnel and having a bottom edge defining with said funnel a limited annular gap for the passage of material to be comminuted; suction-producing means arranged below and coaxial with said body and comprisnig a substantially conical downwardly diverging member having at least one projecting portion extending outwardly from the outer surface thereof and extending substantially from the top to the bottom of said member for producing during high speed rotation of said feed means a suction in said gap whereby material to be comminuted and disposed upwardly of said gap is drawn by said suction downwardly through said gap into contact with said cutting member and, after comminution thereby, is caused to flow radially outwardly through said teeth thereof; and a common drive shaft connected to said body and said member for rotating the same at high speed about said axis.

2. A machine as set forth in claim 1 wherein said projecting portion is a helicoidal rib extending from said bottom edge of said body into the region of said cutting means.

3. In a food comminuting machine, in combination, a housing forming a cutting chamber; cutting means within said chamber; a feed funnel having an upright axis mounted on said housing and communicating with said chamber; a substantially frusticonically downwardly diverging hollow body coaxially arranged in said funnel and having a bottom edge defining with said funnel a limited gap for the passage of material to be comminuted, said body being formed in the outer surface thereof with a helicoidal groove of spiral configuration and with a slot communicating between said groove and the interior of said body; feed means arranged below and coaxial with said body and comprising a substantially conical downwardly diverging member extending with an upper portion thereof into said hollow body and having an outwardly projecting helicoidal rib extending from the top of said member into the region of said cutting means; and a common drive shaft connected to said body and said member for rotating the same at high speed about said axis.

4. A machine as set forth in claim 3 wherein said slot has a width progressively increasing from an upper to a lower portion of said groove.

5. In a food comminuting machine, in combination, a housing forming a cutting chamber; cutting means within said chamber; a feed funnel having an upright axis mounted on said housing and communicating with said chamber; three substantially frustoconical downwardly diverging bodies coaxially arranged in said funnel axially spaced from each other and having each a bottom edge defining with said funnel a limited annular gap for the passage of mterial to be comminuted; a feed means for each said three bodies coxial therewith and arranged below the respective body, each of said feed means including a substantially conical downwardly diverging member, the upper and lowermost of said members being each provided with a plurality of angularly spaced ribs extending along generatrices thereof and the intermediate one thereof being provided with a generally helicoidal rib; and a common drive shaft connected to said bodies and said members for rotating the same at high speed about said axis, whereby during said rotation a suction will be provided in said gaps.

6. In a food comminuting machine, in combination, a housing forming a substantially annular cutting chamber; cutting means within said chamber including a disc provided substantially along its peripheral edge with an annularly arranged row of cutting teeth; a feed funnel mounted on said housing and communicating with said chamber; a substantially frusto-conical feeding member arranged with its diverging end located on said disc of said cutting means coaxially therewith and projecting with its other end into said feed funnel, and having a bottom portion on its diverging end defining with said annularly arranged cutting teeth and said funnel a limited annular gap for the passage of material to be comminuted from said funnel into said cutting means and from there radially outwardly through said annularly arranged cutting teeth; drive means for simultaneously rotating said cutting means and said diverging feeding member; and material-engaging means on said diverging feeding member adapted to feed the material from said funnel into said cutting means during rotation of said cutting means together with said diverging feeding member.

7. In a food comminuting machine, in combination, a housing forming a cutting chamber; cutting means within said chamber; a feed funnel having an upright axis mounted on said housing and communicating with said chamber; a substantially frustoconical downwardly diverging body coaxially arranged in said funnel and having a bottom edge defining with said funnel a limited annular gap for the passage of material to be comminuted; feed means arranged below and coaxial with said body and comprising a substantially conical downwradly diverging member having a plurality of angularly displaced ribs respectively extending in longitudinal direction of said member, said ribs radially projecting from the outer surface thereof and extending substantially from the top to the bottom of said member for producing during high speed rotation of said feed means a suction in said gap; and a common drive shaft connected to said body and said member for rotating the same at high speed about said axis.

References Cited by the Examiner

UNITED STATES PATENTS

| 650,291 | 5/1900 | Zimmerman | 241—259 X |
| 2,697,558 | 12/1954 | Powers | 146—192 X |

FOREIGN PATENTS

| 427,514 | 4/1926 | Germany. |
| 433,702 | 9/1926 | Germany. |

ROBERT C. RIORDON, *Primary Examiner.*

J. SPENCER OVERHOLSER, *Examiner.*